United States Patent Office 3,450,052
Patented June 17, 1969

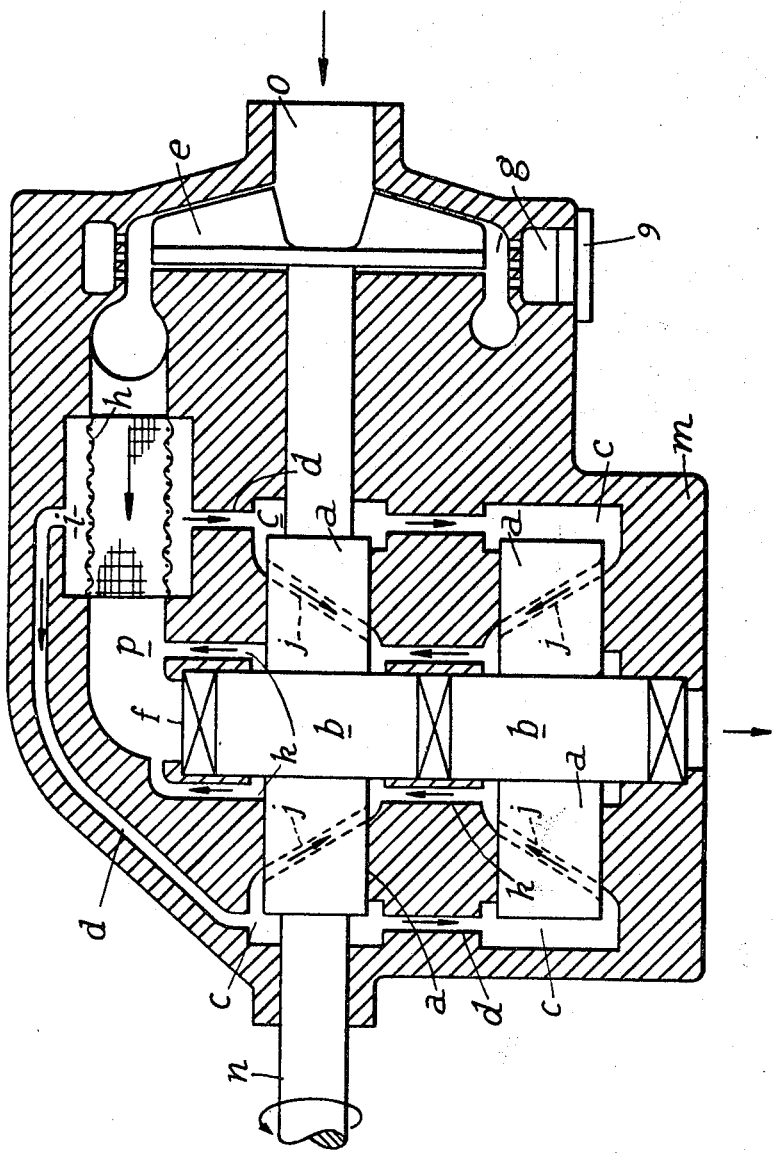

3,450,052
LUBRICATION OF ROTARY PUMPS INTENDED FOR THE DELIVERY OF LIQUID CONTAINING SOLID CONTAMINANTS
Horace G. Turner and Robert S. Wood, Ilford, England, assignors to The Plessey Company Limited, Ilford, England, a British company
Filed May 31, 1967, Ser. No. 642,538
Claims priority, application Great Britain, June 7, 1966, 25,358/66
Int. Cl. F04b 23/04; F04d 29/70; F04c 1/04
U.S. Cl. 103—5      6 Claims

ABSTRACT OF THE DISCLOSURE

The bearings of a rotary pump are lubricated by liquid branched off from the pump inlet line by means of a wash-through filter, which withholds solid contaminants from the bearings, while the main flow of liquid acts to scrub the filter surface.

This invention relates to the lubrication of rotary pumps, particularly rotary gear pumps and other rotary-displacement pumps, and has for an object to provide an improved construction of rotary pump which permits the utilisation of the pumping liquid for lubrication of the pump bearings even when the liquid to be delivered by the pump contains solid contaminants. With this object in view the invention proposes to include the bearings in a branch of the liquid flow passing through the pump and to provide a filter through which only this branch flow, but not the remainder of the flow, is passed. Preferably a self-cleaning kind of filter, or a number of self-cleaning filters connected in series, are employed for this purpose. The flow employed for the lubrication of the bearings may be produced or assisted by viscosity-pump action of the surface of the journals to be lubricated in co-operation with a suitably inclined groove in the bearing surface (or vice versa), and although the flow through the bearings may be branched off the pump flow at the delivery of the pump, it is preferred to employ a branch flow obtained at the pump inlet, thus minimising losses of fluid due to the pressure gradient along the bearings. The filter employed takes preferably the form of a cylindrical sleeve filter forming part of the inlet duct leading the contaminated liquid to the suction side of the pump, this filter extending through an annular collector chamber, from which lubricating liquid is passed through suitable passages to the lubricant inlet end of each bearing, each bearing inlet communicating with the collector chamber by a separate passage or passage branched. If a so-called backing pump is provided at the inlet of the pump to be lubricated, the filter is preferably arranged to form part of the wall of a passage leading from the backing pump to the inlet of the main pump, the backing pump itself being, if desired, provided at its circumference with a collector chamber for centrifugally separated contaminant.

The accompanying drawing is a sectional elevation of a gear pump fitted with a dynamic backing pump on the shaft of the driven gear, the gear pump being equipped with lubrication means according to the present invention.

Referring now to the drawing, the gear pump has two intermeshing gears $b$, each formed on both sides with supporting journals $a$ by which the gears are rotatably supported in the pump housing, and one of the two gears is combined with a drive shaft $n$ on which is also mounted the rotor $e$ of a centrifugal backing pump, which serves to feed contaminated liquid from an inlet $o$ under slight pressure to the inlet port $f$ of the gear pump via a generally cylindrical passage $p$. The backing pump as shown is provided with an annular pocket $g$ in which centrifugally removed suspended matter may collect to be removed from time to time via a drain plug $q$, an arrangement by which the content of the suspended matter may be somewhat reduced before admitting the liquid to the pump inlet $p$. Part of the wall of the cylindrical passage $p$ is formed by a cylindrical filter shell $h$ which separates the passage $p$ from an annular collector chamber $i$. This chamber is employed as the source of lubricant which is fed by distributor passages $d$ to lubrication-supply chambers $c$ provided in the pump housing $m$ at the outer end of each journal $a$.

In order to ensure that equal, or desirably distributed, quantities of liquid are passed through each of the bearings, each bearing is provided with a helical groove $j$ of a suitable helical pitch, which acts as a metering pump. After effecting lubrication of the bearings, the liquid employed for lubrication returns to the pump inlet $f$ via passages $k$ adjacent to the end faces of the gears $b$. These passages $k$, though shown as bores in the housing body $m$, may in practice be formed as open grooves in the housing faces which co-operate with the side surfaces of the gears $b$.

It will be readily appreciated that, since only the small quantity of liquid actually employed for the lubrication of the bearings is arranged to pass through the filter $h$, the dimensions of the filter may be kept small, while the passage of the main flow of liquid through the passage $p$ along the bore of the cylindrical filter shell $h$ produces a continuous scrubbing action preventing undue accumulation of solid matter on the inner surface of the filter.

The illustrated embodiment may be modified in various respects. Thus the utilisation of the centrifugal action of the backing pump $p$ by means of the annular pocket $g$ is optional, and the invention is not limited to pumps which are equipped with a backing pump. Furthermore although the invention has been illustrated in connection with a gear pump, it may be used for the lubrication of other forms of rotary pump, and while the incorporation of the lubrication system at the suction side of the pump tends to promote high volumetric efficiency by reducing leakage losses along the bearings, the invention may, if desired, be alternatively or additionally employed at the delivery side of the pump.

What we claim is:

1. A rotary pump having a pump housing provided with a low-pressure inlet and a delivery outlet, a pumping rotor accommodated in said housing and having journals supported in bearings of said housing, a filter forming a wall element about said inlet and branch flow passage means to derive therefrom a flow of filtered liquid and to be washed at its inlet side by the inlet flow of liquid passing through the pump, passage means connecting said branch flow passage means from said filter to a point of said bearings, further passage means leading from another point of said bearings to said inlet flow of liquid, and means producing a flow of filtered liquid from said filter through said passage means, bearings, and further passage means to said inlet flow.

2. A pump as claimed in claim 1, which includes a pair of intermeshing lobed rotors, each having journals supported by bearings, each said bearing having passage means interposed between said filter and such further passage means so as to be passed by filtered liquid under the action of such flow-producing means.

3. A rotary pump as claimed in claim 1 or claim 2, wherein the filter is a cylindrical sleeve filter forming part of the inlet duct leading the contaminated liquid to the suction side of the pump and extends through an annular collector chamber, from which lubricating liquid is passed through suitable passages to the lubricant inlet end of each bearing, each bearing inlet communicating with the collector chamber by at least one separate passage branch.

4. A pump as claimed in claim 1 or claim 2, wherein each bearing is provided with a helical groove co-operating with the journal supported in said bearing to perform a viscosity-pump action upon the aforesaid filtered liquid.

5. A rotary pump as claimed in claim 1 or claim 2 and having a dynamic backing pump at the inlet of the rotary pump, wherein the filter is arranged to form part of the wall of a passage leading from the backing pump to the inlet of the rotary pump.

6. A pump as claimed in claim 5, wherein the backing pump is provided at its circumference with a collector chamber for centrifugally separated contaminant.

References Cited
UNITED STATES PATENTS

| | | |
|---|---|---|
| 2,833,525 | 5/1958 | Pennington. |
| 2,963,980 | 12/1960 | White. |
| 2,969,019 | 1/1961 | Lorenz et al. _____ 103—220 |
| 3,221,663 | 12/1965 | Schofield et al. _____ 103—220 |
| 3,372,646 | 3/1968 | Pinkas et al. |

HENRY F. RADUAZO, *Primary Examiner.*

U.S. Cl. X.R.

103—111, 126, 220